ит

United States Patent
Yoon et al.

(10) Patent No.: US 7,200,744 B2
(45) Date of Patent: Apr. 3, 2007

(54) APPARATUS AND METHOD FOR CONTROLLING DEVICE OPERATION IN COMPUTER

(75) Inventors: Dong Hun Yoon, Gwangmyeong-si (KR); Yang Hoon Kim, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 451 days.

(21) Appl. No.: 10/622,458

(22) Filed: Jul. 21, 2003

(65) Prior Publication Data
US 2004/0104888 A1 Jun. 3, 2004

(30) Foreign Application Priority Data
Nov. 14, 2002 (KR) ............... 10-2002-0070875

(51) Int. Cl.
*G06F 9/24* (2006.01)
(52) U.S. Cl. ............... 713/1; 713/2; 713/100
(58) Field of Classification Search ............ 713/1, 713/2, 100, 320, 324; 345/156, 163, 168, 345/173
See application file for complete search history.

(56) References Cited

U.S. PATENT DOCUMENTS

| | | | |
|---|---|---|---|
| 5,136,694 A * | 8/1992 | Belt et al. ............... 710/67 |
| 5,511,184 A * | 4/1996 | Lin ............... 710/261 |
| 5,642,318 A * | 6/1997 | Knaack et al. ............ 365/201 |
| 5,669,015 A   | 9/1997 | Chidester et al. .......... 395/893 |
| 5,805,139 A * | 9/1998 | Uehara ................ 345/156 |
| 5,831,613 A * | 11/1998 | Johnston et al. .......... 715/771 |
| 5,990,872 A * | 11/1999 | Jorgenson et al. .......... 345/168 |
| 6,101,608 A * | 8/2000 | Schmidt et al. ................ 726/2 |
| 6,223,229 B1 * | 4/2001 | Kvamme ............... 710/10 |
| 6,341,320 B1 * | 1/2002 | Watts et al. ............... 710/100 |
| 6,735,453 B1 * | 5/2004 | Bobisuthi et al. ......... 455/575.2 |
| 6,798,887 B1 * | 9/2004 | Andre .................. 381/73.1 |
| 6,829,672 B1 * | 12/2004 | Deng et al. ............... 711/103 |
| 2002/0019924 A1 * | 2/2002 | Davies et al. ............ 712/1 |
| 2002/0091850 A1 * | 7/2002 | Perholtz et al. ............ 709/231 |
| 2002/0180704 A1 * | 12/2002 | Rudd ................... 345/168 |
| 2004/0061682 A1 * | 4/2004 | Landfried ............... 345/163 |
| 2005/0206355 A1 * | 9/2005 | Leith et al. ............... 323/274 |
| 2005/0251481 A1 * | 11/2005 | Linnartz ................. 705/51 |

FOREIGN PATENT DOCUMENTS

| JP | 07-253850 | 10/1995 |
|---|---|---|
| WO | WO02/065264 | 8/2002 |

* cited by examiner

*Primary Examiner*—Thomas Lee
*Assistant Examiner*—Malcolm Cribbs
(74) *Attorney, Agent, or Firm*—Ked & Associates, LLP

(57) ABSTRACT

Disclosed is an apparatus and method for controlling driving of an auxiliary device in a computer. The computer would include an operating system (OS) having at least one of a keyboard controller driver and a system BIOS that controls the enabled/disabled status of an internal auxiliary device based on the attachment status of an external auxiliary device. The internal auxiliary device may be a keyboard, a touch pad, or a pointing stick. The external auxiliary device may be a USB mouse. A method embodying the invention may include the steps of: periodically checking whether an external auxiliary device has been attached/detached to/from the computer, and disabling or enabling driving of the internal device or the external device depending on the checking results.

32 Claims, 4 Drawing Sheets

APPARATUS AND METHOD FOR CONTROLLING DEVICE OPERATION IN COMPUTER

BACKGROUND OF THE INVENTION

1. Field of the Invention

The present invention relates to an apparatus and method for controlling the driving of an auxiliary device in a portable computer. A computer embodying the invention is capable of controlling the driving of an internal auxiliary device such as a touch pad, and the driving of an external auxiliary device such as an USB (Universal Serial Bus) mouse in a portable computer, such as a notebook computer.

2. Background of the Related Art

FIG. 1 is a block diagram of elements of a typical portable computer. The computer includes a keyboard controller driver or a system BIOS (Basic Input/Output System) 10; a keyboard controller 11; and a keyboard 12. Also, the computer may additionally include an internal auxiliary device 13 such as a touch pad or a pointing stick; an external auxiliary device 14 such as a PS/2 (Personal System/2) mouse; and a CMOS (Complementary Metal Oxide Semiconductor) memory 15.

The keyboard controller driver or the system BIOS initializes the internal auxiliary device such as a touch pad 13 and the external auxiliary device such as a PS/2 mouse 14 through an interface with the keyboard controller 11 when the system power is turned on. Also, the keyboard controller 11 performs a series of operations for driving the touch pad 13 and the PS/2 mouse 14.

Recently, an external auxiliary device using an USB interface, for example a USB mouse, may be attached to a computer as the external auxiliary device 14. A USB mouse is not connected with the keyboard controller 11, but instead is directly connected with the keyboard controller driver or the system BIOS 10. As a result, the keyboard controller 11 is unable to perceive the connection status of the USB mouse, and driving of the internal auxliary device such as the touch pad 13 is not automatically disabled when a USB mouse is attached to the computer.

Upon performance of the general booting process of the computer, when the touch pad or the PS/2 mouse is not attached to the computer, the system BIOS 10 recognizes that the touch pad or the PS/2 mouse is not present in the current system, because the touch pad or the PS/2 mouse does not respond when the system BIOS 10 attempts to initialze the touch pad or the PS/2 mouse. Therefore, if the system is booted without a mouse attached, but a user intends to use a mouse by attaching it to the computer after the boot operation is performed, the mouse is not usable. In order to use the mouse, a user must turn off the system power and physically attach the mouse to the computer, and then boot the system again so that the system BIOS 10 may recognize the mouse.

Similarly, if the computer boots up with a mouse attached, the touch pad is disabled at the CMOS setup. In this instance, the touch pad operates as if it were not connected physically with the keyboard controller. In order to operate the touch pad, the system should be booted again after the CMOS setup is enabled, or after the mouse has been disconnected. In other words, if a user wants to switch from an internal pointing device to an external pointing device after the boot operation, or vice versa, it is necessary to re-boot the system.

SUMMARY OF THE INVENTION

An object of the invention is to solve at least the above problems and/or disadvantages and to provide at least the advantages described hereinafter.

Accordingly, one object of the present invention is to solve the foregoing problems by providing a method for controlling driving of an auxiliary device in a portable computer to automatically disable or enable driving of an internal device such as a touch pad depending on whether an external auxiliary device such as an USB mouse is attached.

Another object of the present invention is to provide a method for controlling driving of an auxiliary device in a portable computer to disable or enable, without rebooting of the system, the driving of an external/internal auxiliary device depending on whether the external/internal auxiliary device such as a touch pad or a mouse is attached. The method may also be accomplished using a function key provided on the portable computer.

A device embodying the invention may include an OS having at least one of a keyboard controller driver and a system BIOS for controlling an operation state of an internal auxiliary device by monitoring whether an external auxiliary device is attached. The internal auxiliary device could include at least one of a pointing stick, a keyboard and a touch pad, which are input means. The device may also include a keyboard controller communicating with the OS and the internal auxiliary device, for performing transmission/reception of information; a CMOS memory connected with the OS, for storing data; and an external auxiliary device, which is an input device, connected with the OS.

A method embodying the invention may include the steps of: checking an internal auxiliary device attached to the computer upon driving of the system; checking the connection status of an attached external auxiliary device or the internal auxiliary device at the normal driving status of the system; and disabling or enabling operation of the internal device or the external device depending on the checking results.

In a device embodying the invention, operation of the internal auxiliary device such as a touch pad is automatically disabled or enabled, depending on whether an external auxiliary device such as an USB mouse is attached. Also, the operation of the external auxiliary device or the internal auxiliary device such as a touch pad is conveniently disabled or enabled with use of a function key provided on the portable computer, so that a user does not need to reboot the computer system to disable or enable operation of the internal/external auxiliary device through the setup procedure on the CMOS memory.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF PREFERRED EMBODIMENTS

Figure 1:
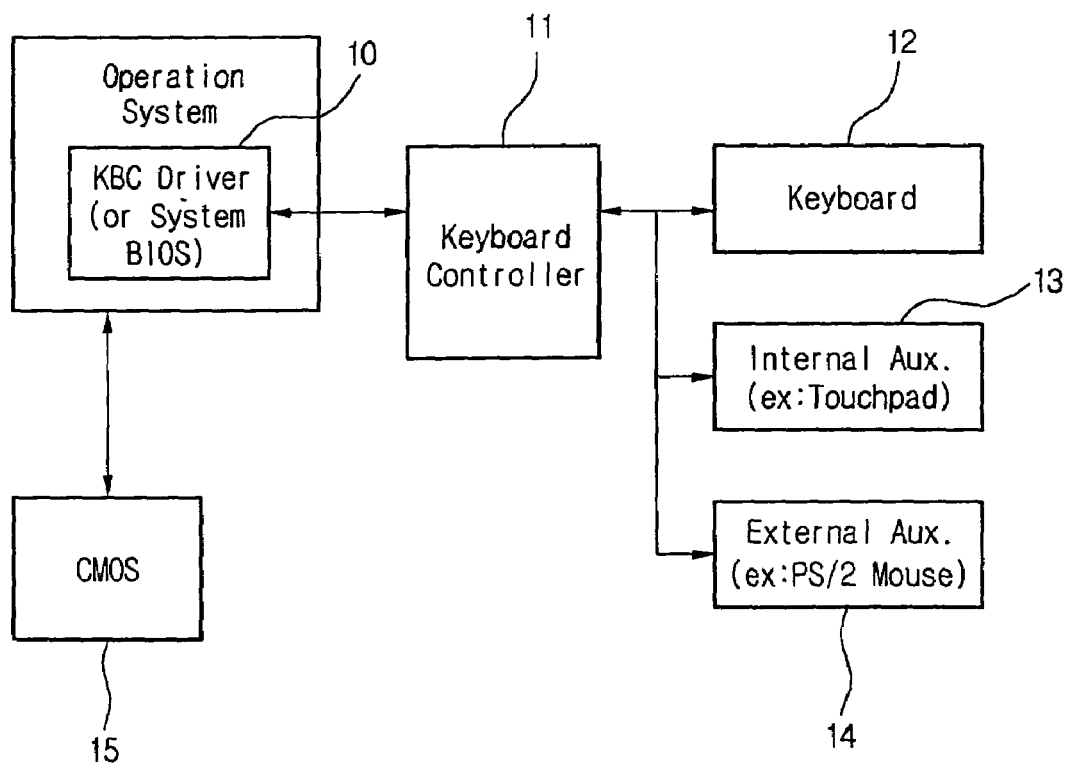
FIG. 1 is a block diagram of portions of a general portable computer.

The following detailed description will present an apparatus and method for controlling operation of an auxiliary device in a portable computer according to a preferred embodiment of the invention in reference to the accompanying drawings. In the following description, the same drawing reference numerals are used for the same elements whenever possible.

Figure 2:
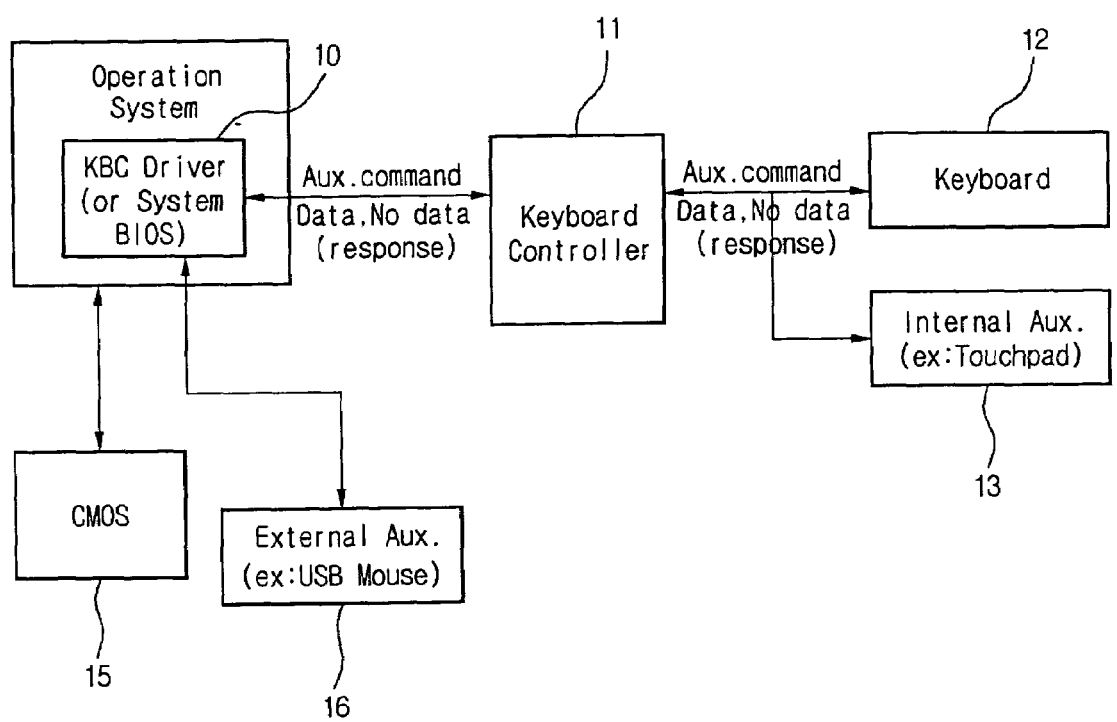
FIG. 2 is a block diagram of portions of a portable computer adopting a method for controlling operation of an auxiliary device according to the present invention.

FIG. 2 is a block diagram showing elements of a portable computer adopting a method for controlling operation of an auxiliary device according to the present invention. The portable computer includes a keyboard controller driver included in an OS or a system BIOS 10; a keyboard controller 11; and a keyboard 12. Also, an internal auxiliary device 13 such as a touch pad and an external auxiliary device 16 such as an USB mouse, may be included in or connected with the notebook computer.

The keyboard controller driver or the system BIOS 10 initializes the internal auxiliary device, for example, a touch pad 13 through an interface with the keyboard controller 11 when the system power is turned on without the external auxiliary device, such as a USB mouse, connected to the notebook computer.

Also, the keyboard controller 11 performs a series of operations for driving the touch pad 13. If a user connects an external auxiliary device, for example a USB mouse 16, to the computer, then the keyboard controller or the system BIOS 10, performs a series of operations to enable the USB mouse and to monitor whether the USB mouse is still connected.

Figure 3:
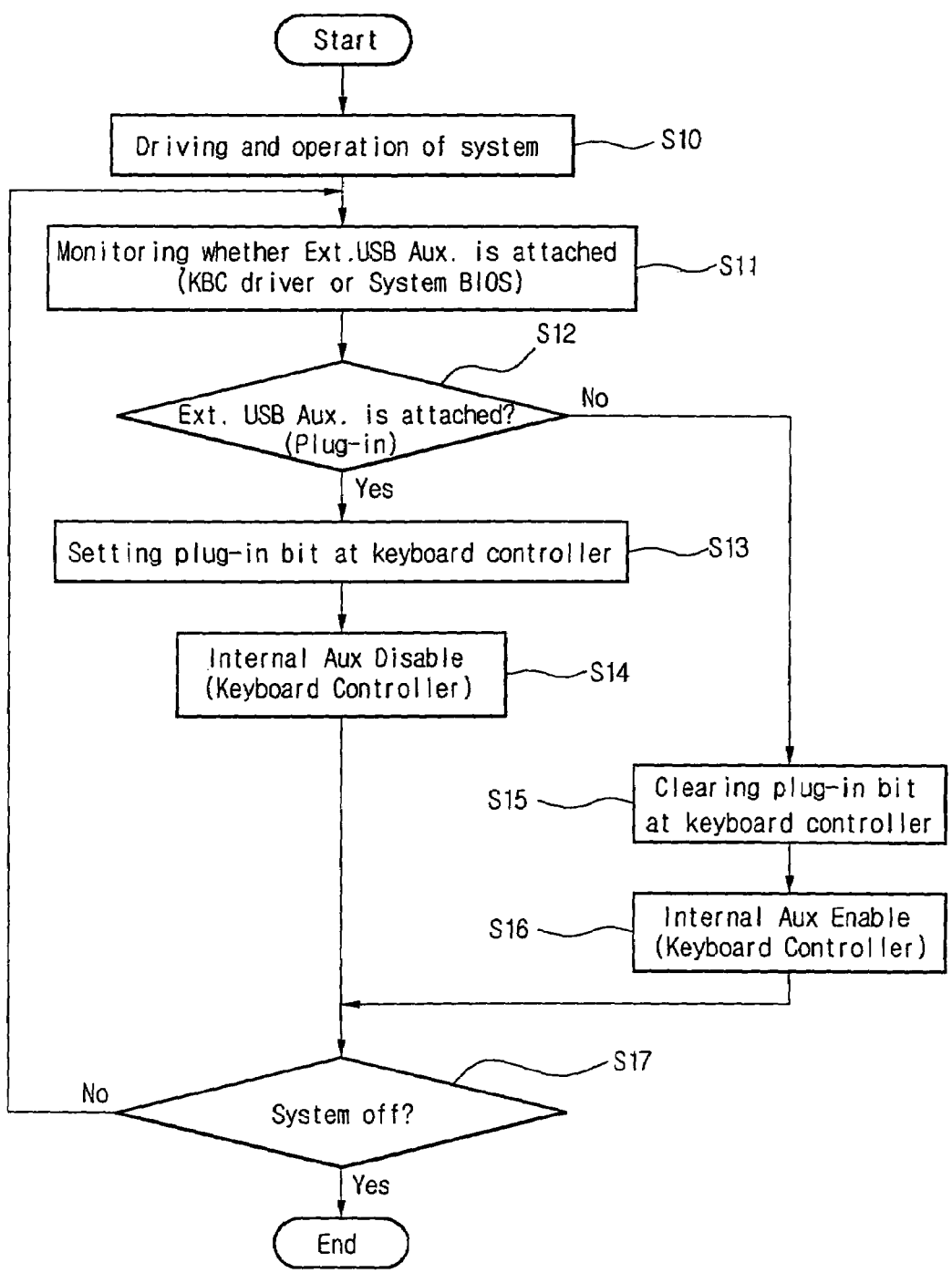
FIG. 3 is a flowchart showing steps of a method for controlling operation of an auxiliary device in a portable computer according to the present invention.

FIG. 3 is a flowchart showing operations of a method embodying the present invention for automatically controlling operation of an auxiliary device depending on whether the external auxiliary device is attached to the computer. As described above, when the system of the computer is driven and operated after the general booting procedures have been accomplished, the keyboard controller driver or the system BIOS 10 monitors whether the USB mouse 16 is connected to the notebook computer by a user (S11).

Then, as a result of such monitoring, if the USB mouse is detected to be connected, namely, a plug-in is detected (S12), the keyboard controller driver 10 sets a plug-in bit at the keyboard controller to indicate that the USB mouse is connected (S13). Also, information that the USB mouse is connected may be known to the keyboard controller 11 through an auxiliary command.

In the meantime, the keyboard controller 11 confirms the plug-in bit set through the foregoing procedure, then changes the status of the touch pad 13 which is presently in an enable status, into a disable status (S14).

Therefore, from then on, the disabled touch pad 13 ignores any data provided from a user, only performing a series of operations for responding to a command transmitted from the keyboard controller 11 after the keyboard controller 11 receives a certain command from the keyboard controller driver or the system BIOS 10.

Here, the keyboard controller driver or the system BIOS 10 recognizes as if the touch pad 13 were always present, with respect to the above response from the touch pad 13. Such recognition is for the keyboard controller driver or the system BIOS 10 to always recognize as if the keyboard controller driver or the system BIOS 10 had initialized the touch pad 13 already. For the above command, there exist 'reset', 'send', 'sample rate'.

The reason why such command is regularly transmitted, is for maintaining initialized status by regularly maintaining the response.

In the meantime, the command may not be transmitted regularly and maintained in a standby status. In this case, if it is necessary to use the internal touchpad, the device may possibly be woken up and operated.

Also, the keyboard controller driver or the system BIOS 10 enables operation of the USB mouse 16. If the USB mouse is not attached or the attached USB mouse is detached, namely, a plug-out is detected as a result of the monitoring, the keyboard controller driver or the system BIOS 10 clears the setting of the keyboard controller by transmitting a command for canceling a plug-in bit representing that the USB mouse is attached (S15).

The keyboard controller 11 confirms a plug-in bit has been cleared through the foregoing procedure, then maintains operation of the touch pad 13 which is presently in an enabled status, or changes the status of the touch pad 13 from a disabled status, into an enabled status (S16).

In a computer embodying the invention, if a user attaches the external auxiliary device, such as a USB mouse 16, operation of the internal auxiliary device, such as a touch pad 13, is automatically disabled. If a user detaches a USB mouse 16, operation of the touch pad 13 is automatically enabled.

Figure 4:
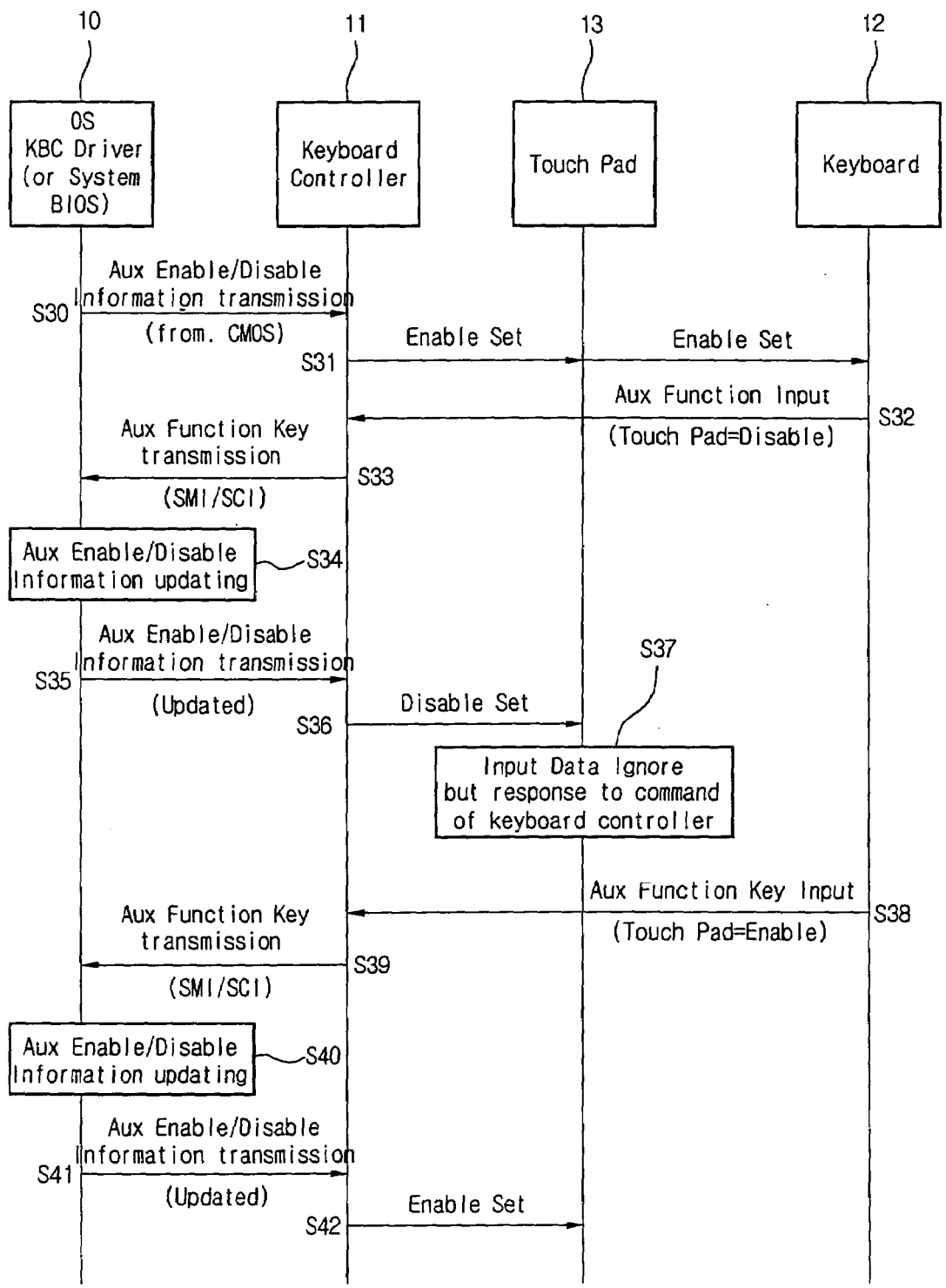
FIG. 4 is a flowchart showing steps of another embodiment of a method for controlling operation of an auxiliary device in a portable computer according to the present invention.

FIG. 4 shows the flow of messages used to control operation of an auxiliary device in a portable computer according to the present invention. In this system, one or more keys on a keypad of the computer can be used to enable or disable the touchpad, and/or an external auxiliary device. For example, when the computer system performs the general booting process, the OS including the keyboard controller driver and the system BIOS 10, reads enable/disable information regarding the auxiliary devices stored in a CMOS memory 15, then transmits the information to the keyboard controller 11 through the keyboard controller driver or the system BIOS 10 (S30).

Here, the keyboard controller 11 stores the enable/disable information, and controls the touch pad 13, for example, enables the touch pad 13 by confirming the enable/disable information (S31).

When the touch pad 13 is enabled, if a user inputs a predetermined specific function key, for example, a function key for disabling the touch pad 13 after attaching an external auxiliary device such as the USB mouse 16, to the notebook computer, then the keyboard 12 provides a corresponding signal to the keyboard controller 11 (S32).

The keyboard controller 11 transmits the signal received through the foregoing procedure, to the keyboard controller driver or the system BIOS 10 through a SMI (System Management Interrupt) or a SCI (System Configuration Interrupt) (S33). The OS or the BIOS updates and stores the enable/disable information stored in the CMOS 15 so that a disable operation of the touch pad 13 may be performed as requested by a user, by confirming the interrupt (S34).

The updated and stored enable/disable information is transmitted to the keyboard controller 11 through the keyboard controller driver or the system BIOS 10 (S35).

Also, when the touch pad 13 is enabled, it may be possible that a user disables the touch pad through the touch pad itself or an UIP (User Interface Program) after attaching the external auxiliary device such as the USB mouse 16 to the computer.

The keyboard controller 11 stores the updated enable/disable information, then disables the touch pad 13, which is presently in an enabled status, with reference to the above enable/disable information (S36). From then on, the disabled touch pad 13 ignores any data provided from a user (S37), only performing a series of operations for responding to a command transmitted from the keyboard controller 11. The USB mouse 16 attached by a user is directly enabled by the keyboard controller driver 10.

Here, the keyboard controller driver or the system BIOS 10 recognizes as if the touch pad 13 were always present, with respect to the above response from the touch pad 13. Such recognition is for the keyboard controller driver or the system BIOS 10 to always recognize as if the keyboard controller driver or the system BIOS 10 had initialized the touch pad 13 already. For the above command, there exist 'reset', 'send', 'sample'.

Also, if a user inputs a predetermined specific function key, for example, a function key for enabling the touch pad 13 after detaching the USB mouse 16 from the computer, then the keyboard 12 outputs a signal corresponding to the function key input, to the keyboard controller 11 through the UIP (S38).

The keyboard controller 11 transmits the signal received through the foregoing procedure, to the keyboard controller driver or the system BIOS 10 through the SMI or the SCI (S39). The OS or the BIOS updates and stores again the enable/disable information updated and stored in the CMOS 15 so that an enable operation of the touch pad 13 may be performed as requested by a user, by confirming the interrupt (S40).

The enable/disable information updated and stored again as described above, is transmitted to the keyboard controller 11 through the keyboard controller driver 10, and the keyboard controller 11 stores the updated enable/disable information. The keyboard controller 11 then enables the touch pad 13, which is presently in a disabled status, referring to the above enable/disable information (S42). The enabled touch pad 13 performs a series of operations for transmitting data input from a user to the keyboard controller 11.

Therefore, upon being disabled, the touch pad 13 responds to a command transmitted from the keyboard controller 11, and the system BIOS recognizes as if the system BIOS had initialized the touch pad already, so that the touch pad 13 is possibly enabled/disabled without rebooting of the system.

While the invention has been shown and described with reference to certain preferred embodiments thereof, it will be understood by those skilled in the art that various changes in form and details may be made therein without departing from the spirit and scope of the invention as defined by the appended claims.

The foregoing embodiments and advantages are merely exemplary and are not to be construed as limiting the present invention. The present teaching can be readily applied to other types of apparatuses. Many alternatives, modifications, and variations will be apparent to those skilled in the art. In the claims, means-plus-function clauses are intended to cover the structures described herein as performing the recited function and not only structural equivalents but also equivalent structures.

For example, operation of the external auxiliary device could be conveniently disabled or enabled, without rebooting of the system, depending on whether the external auxiliary device such as the USB based device is attached or not, with use of the function key provided to the portable computer.

Also, operation of the internal auxiliary device could be conveniently disabled or enabled, without rebooting of the system, depending on whether the internal auxiliary device is attached or not, with use of the function key.

Therefore, the description of the present invention is intended to be illustrative, and not to limit the scope of the claims.

What is claimed is:

1. A computer system, comprising:
    an internal input device configured to receive user commands; and
    a controller coupled to the internal input device and communicating with an operating system program that determines when an external Universal Serial Bus (USB) input device is attached to the computer, and wherein the operating system is configured to ignore data from the internal input device and to receive data from the external USB input device when an external USB input device is attached to the computer system.

2. The apparatus according to claim 1, wherein the internal input device comprises at least one of a keyboard, a touch pad, and a pointing stick.

3. The apparatus according to claim 1, wherein the external USB input device comprises a USB mouse.

4. The apparatus according to claim 1, wherein the operating system is also configured to determine when an external USB input device is detached from the computer system, and wherein the operating system is configured to begin receiving data from the internal input device when the external USB input device is detached from the computer system.

5. The apparatus according to claim 4, wherein the operating system is configured to update a system BIOS memory to indicate that an external USB input device has been attached when the attachment of an external USB input device is detected, and wherein the operating system is also configured to update a system BIOS memory to indicate that an external USB input device has been detached when the detachment of an external LSB input device is detected.

6. A computer system, comprising:
    an internal input device configured to receive user commands; and
    a controller coupled to the internal input device and communicating with an operating system program that is configured to receive an enable function key input indicating that an external input device should be enabled, wherein the operating system is configured to ignore data from the internal input device and to receive data from the external input device when the enable function key input is received.

7. The apparatus according to claim 6, wherein the internal input device comprises at least one of a keyboard, a touch pad, and a pointing stick.

8. The apparatus according to claim 6, wherein the external input device comprises a USB mouse.

9. The apparatus according to claim 6, wherein the operating system is also configured to receive a disable function key input that indicates that the external input device should be disabled, and wherein the operating system is configured to begin receiving data from the internal input device and to stop receiving data from the external input device when the disable function key input is received.

10. The apparatus according to claim 9, wherein the operating system is configured to update a system BIOS memory to indicate that an external input device has been attached when the enable function key input is received, and wherein the operating system is also configured to update a system BIOS memory to indicate that an external input device has been detached when the disable function key input is received.

11. A method for controlling a computer, comprising:
determining whether an external USB input device has been attached to the computer, and
disabling an internal input device of the computer and enabling the external USB input device when the result of the determining step indicates that an external USB input device has been attached to the computer, including ignoring data from the internal input device and receiving data from the external USB input device when an external USB input device is attached to the computer.

12. The method according to claim 11, wherein the step of disabling an internal input device of the computer and enabling the external USB input device comprises updating a system BIOS.

13. The method according to claim 11, wherein the determining step comprises automatically determining when an external USB input device has been attached to the computer.

14. The method according to claim 11, wherein the determining step comprises receiving an enable function key input.

15. The method according to claim 11, further comprising:
determining when the external USB input device has been detached from the computer, and
disabling the external USB input device and enabling the internal input device when the result of the determining step indicates that an external USB input device has been detached from the computer.

16. The method according to claim 15, wherein step of determining when the external USB input device has been detached from the computer comprises automatically determining when the external USB input device has been detached from the computer.

17. The method according to claim 15, wherein the step of determining when the external USB input device has been detached from the computer comprises receiving a disable function key input.

18. The method according to claim 11, further comprising updating a system BIOS when the result of the determining step indicates that an external USB input device has been attached to the computer.

19. The method according to claim 11, further comprising exchanging periodic messages between a controller and the internal input device after the internal input device has been disabled such that it is not necessary to re-initialize the internal input device in order to re-enable the internal input device.

20. A computer system, comprising:
means for determining whether an external USB input device has been attached to the computer, and
means for disabling an internal input device of the computer and enabling the external USB input device when the result of the determining step indicates that an external USB input device has been attached to the computer, including means for ignoring data from the internal input device and receiving data from the external USB input device when an external USB input device is attached to the computer.

21. A computer readable medium that includes software configured to cause a computer to perform the steps of:
determining whether an external USB input device has been attached to the computer, and
disabling an internal input device of the computer and enabling the external USB input device when the result of the determining step indicates that the external USB input device has been attached to the computer, including ignoring data from the internal input device and receiving data from the external USB input device when an external USB input device is attached to the computer.

22. The computer readable medium of claim 21, wherein the software is also configured to cause the computer to automatically determine when the external USB input device is attached to the computer.

23. The computer readable medium of claim 21, wherein the software is also configured to cause the computer to receive a function key input indicating that the external USB device has been attached to the computer.

24. The computer readable medium of claim 21, wherein the software is also configured to cause the computer to perform the steps of:
determining when the external USB input device has been detached from the computer, and
disabling the external USB input device and enabling the internal input device when the result of the determining step indicates that an external USB input device has been detached from the computer.

25. The computer readable medium of claim 24, wherein the software is also configured to cause the computer to automatically determine when the external USB input device is detached from the computer.

26. The computer readable medium of claim 24, wherein the software is also configured to cause the computer to receive a function key input indicating that the external USB input device has been detached from the computer.

27. The apparatus according to claim 6, wherein the operating system is configured to directly receive data from the external input device via a universal serial bus (USB).

28. The apparatus according to claim 6, wherein the controller forwards data from the internal input device to the operating system, even after the enable function key input has been received by the operating system.

29. The apparatus according to claim 1, wherein the operating system is configured to receive data directly from the external USB input device, via the universal serial bus, when the external USB input device is attached to the computer.

30. The method according to claim 11, wherein enabling the external USB input device comprises configuring the computer such that data from the external USB input device is sent directly to the computer's operating system via the universal serial bus.

31. The computer system according to claim 20, wherein the means for enabling the external USB input device comprise means for configuring the computer such that data from the external USB input device is sent directly to the computer's operating system via the universal serial bus.

32. The computer readable medium of claim 21, wherein the software is also configured to cause the computer to receive data directly from the external USB input device via the universal serial bus.

* * * * *